United States Patent
Dhanyamraju et al.

(10) Patent No.: US 10,685,053 B2
(45) Date of Patent: Jun. 16, 2020

(54) SYSTEM AND METHOD FOR GENERATING PROFESSIONAL PROFILE FOR EMPLOYEES

(71) Applicant: HCL Technologies Limited, Noida, Uttar Pradesh (IN)

(72) Inventors: S U M Prasad Dhanyamraju, Hyderabad (IN); Satya Sai Prakash Kanakadandi, Hyderabad (IN); Simy Chacko, Hyderabad (IN)

(73) Assignee: HCL Technologies Limited, Noida, Uttar Pradesh ( * ) Notice: Subject to any disclaimer, the term of this patent is extended or adjusted under 35 U.S.C. 154(b) by 170 days.

(21) Appl. No.: 15/628,285

(22) Filed: Jun. 20, 2017

(65) Prior Publication Data

US 2018/0004839 A1    Jan. 4, 2018

(30) Foreign Application Priority Data

Jul. 2, 2016   (IN) .............................. 201611022818

(51) Int. Cl.
| | |
|---|---|
| G06Q 10/00 | (2012.01) |
| G06F 16/36 | (2019.01) |
| G06F 16/335 | (2019.01) |
| G06F 40/211 | (2020.01) |
| G06F 40/295 | (2020.01) |

(52) U.S. Cl.
CPC .......... *G06F 16/367* (2019.01); *G06F 16/337* (2019.01); *G06F 40/211* (2020.01); *G06F 40/295* (2020.01)

(58) Field of Classification Search
CPC ................................ Y04S 10/54; G06Q 10/06
See application file for complete search history.

(56) References Cited

U.S. PATENT DOCUMENTS

| | | | | |
|---|---|---|---|---|
| 2011/0055264 | A1* | 3/2011 | Sundelin ............. | G06Q 10/107 707/776 |
| 2013/0110733 | A1* | 5/2013 | Mohanty ............. | G06Q 10/06 705/320 |
| 2014/0358606 | A1* | 12/2014 | Hull .................. | G06Q 10/063112 705/7.14 |
| 2015/0100356 | A1* | 4/2015 | Bessler .............. | G06Q 30/01 705/7.12 |
| 2016/0275347 | A1* | 9/2016 | Sukhodolov ....... | G06K 9/00469 |
| 2017/0236081 | A1* | 8/2017 | Grady Smith ..... | G06Q 10/0637 705/7.36 |

OTHER PUBLICATIONS

Ian Bugeja, "Analyzing Email Communications (Part 1)", Oct. 28, 2013.
Ian Bugeja, Analyzing Email Communications (Part 2), Nov. 7, 2013.

* cited by examiner

*Primary Examiner* — Justin S Lee
(74) *Attorney, Agent, or Firm* — HM Law Group LLP; Vanintheran Moodley

(57) ABSTRACT

System and method for generating professional profile of an employee in an organization are disclosed. An organizational ontology may be built for the employee. The organizational ontology may be indicative of interrelationships between the employee, other employees and tasks performed by the employee. Further, email data associated with the employee may be stored for a complete lifecycle of the employee. The email data may be analyzed to identify insights about the employee and the professional profile may be generated based on the identified insights.

8 Claims, 4 Drawing Sheets

SYSTEM AND METHOD FOR GENERATING PROFESSIONAL PROFILE FOR EMPLOYEES

CROSS REFERENCE TO RELATED APPLICATIONS AND PRIORITY

The present application claims priority from Indian Patent Application No. 201611022818 filed on 2 Jul. 2016 the entirety of which is hereby incorporated by reference

TECHNICAL FIELD

The present disclosure in general relates to the field of data analytics. More particularly, the present disclosure relates to a system and method for creating professional profile for employees in an organization.

BACKGROUND

Any organization, big or small, has employees communicating with each other as well as customers and business associates at all times. Such communication is vital for developing business, delegation of work, knowledge transfer, and the like. More often than not, these organizational communications occur over electronic mail or email. Email has thus become an invaluable digital vault containing very large quantities of data crucial and beneficial to an organization.

Typically, in an organization, emails become an alter-ego of an employee even before he/she joins the organization. For example, a recruiter working with the organization may have communication with a prospective candidate using their official email, and the perspective candidate may be using his/her personal email. Further, during the entire course of the recruitment process, the candidate's details such as personal details and resume, may be stored within the organization's email database. On the other hand, while leaving the organization, details about entire work tenure of the employee may be available in the employee's emails. However, many a times such data may be overlooked. Also, an organization may not be aware of the potential of stored email data.

SUMMARY

This summary is provided to introduce aspects related to system and method for generating a professional profile for an employee in an organization, further described below in the detailed description. This summary is not intended to identify essential features of the claimed subject matter nor is it intended for use in determining or limiting the scope of the claimed subject matter.

In one implementation, a system for generating a professional profile is disclosed. The system includes a memory and a processor coupled to the memory. The processor may be configured to execute instructions stored in the memory to build an organizational ontology for an employee working in an organization, wherein the organizational ontology comprises a plurality of branches indicative of interrelationships between the employee, one or more other employees and one or more tasks performed by the employee. The processor may be further configured to execute instructions stored in the memory to store email data for the employee, wherein the email data is stored for an employee lifecycle of the employee, and wherein the employee lifecycle is indicative of a tenure completed by the employee in the organization. The processor may be further configured to execute instructions stored in the memory to analyze, based on each branch of the organizational ontology, the stored email data, for determining one or more insights associated with the employee. Further, the processor is configured to execute instructions stored in the memory to generate a professional profile for the employee, based at least on the one or more insights.

In another implementation, a method for generating a professional profile is disclosed. The method includes building an organizational ontology for an employee working in an organization, wherein the organizational ontology comprises a plurality of branches indicative of interrelationships between the employee, one or more other employees and one or more tasks performed by the employee. The method further includes storing email data for the employee, wherein the email data is stored for an employee lifecycle of the employee, wherein the employee lifecycle is indicative of a tenure completed by the employee in the organization. The method further includes analyzing, based on each branch of the organizational ontology, the stored email data, for determining one or more insights associated with the employee. Further, the method includes generating a professional profile for the employee, based at least on the one or more insights.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

The present systems and methods will now be described more fully hereinafter with reference to the accompanying drawings in which exemplary embodiments of the disclosure are shown. However, the disclosure may be embodied in many different forms and should not be construed as limited to the representative embodiments set forth herein. The exemplary embodiments are provided so that this disclosure will be both thorough and complete, and will fully convey the scope of the disclosure and enable one of ordinary skill in the art to make, use and practice the disclosure. Like reference numbers refer to like elements throughout the various drawings.

Figure 1:
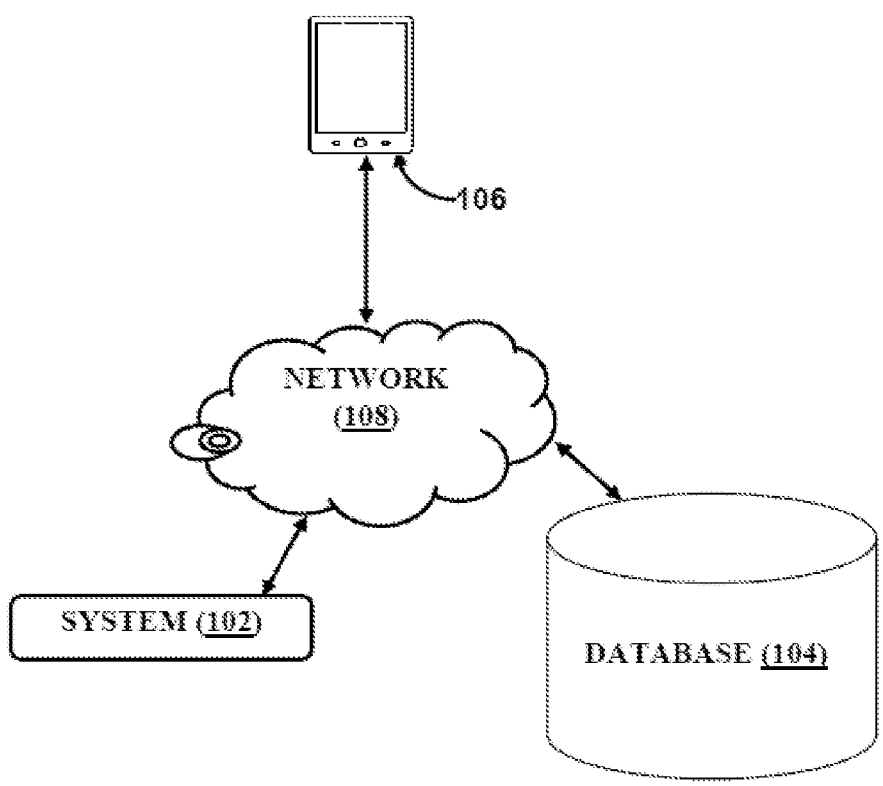
FIG. 1 illustrates a network implementation of a system for generating a professional profile, in accordance with an embodiment of the present subject matter.

Referring to FIG. 1, a network implementation 100 of a system 102 for generating a professional profile for an employee working in an organization. The system 102, in one implementation, may be configured to generate the professional profile for the employee based on an organizational ontology associated with the employee. The system 102, in an example, may analyze email data for the employee for a plurality of branches of the organizational ontology. In an implementation, the plurality of branches of the organizational ontology may be created based on designations, reporting structures, entity relationships, one or more skill sets, department information, and job profiles associated with a plurality of employees in the organization.

In in an exemplary implementation, a professional profile for an employee may be generated based on email data of the employee stored for an entire employee lifecycle. In an implementation, the employee lifecycle may be indicative of a tenure spent by the employee working in the organization. Email data for the employee may be stored for multiple stages of the employee lifecycle. In an example, the system 102 may pull the email data for the employee from a central database 104. The central database 104, in one implementation, may be a data repository for storing information about the organization such as email data of employees, personal details of employees, designations, leave details, current projects, departmental information, and the like. Email data for a particular employee may be pulled from the central database 104 in a periodic or on a need basis fashion. In an example data from the central database 104 may be communicated to the system 102 over a network 106.

In general, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

In an embodiment, the system 102 may analyze the email data for the employee to create the professional profile of the employee. In the embodiment, the system 102 may analyze the email data for the employee based on the organizational ontology of the organization. As described, the email data for the employee may be stored within the system 102 for each stage of the employee lifecycle. In an example, the employee lifecycle may be divided into three stages viz. start of employment, end of employment and any time between the start and the end of employment. The email data for the employee may be pulled from the central database 104 for each stage of the employee lifecycle. For example, during the start of employment for the employee, email data may be indicative of projects being assigned to the employee, reporting structures, training schedules, and the like. Similarly, during the end of employment, the email data may be indicative of skills acquired, teams managed, promotions received, escalations initiated, and the like for the employee.

In an embodiment, one or more insights about the employee may be identified by analyzing the email data of the employee against one or more branches of the organizational ontology. For example, content and signatures in an email may be analyzed to identify name and company of a customer and a recipient of the email. If it is determined, that one of the recipients is a senior management member—based on the organizational ontology—the content may be further parsed to determine whether the email was an escalation, complaint, or general feedback. Based on such analysis, one or more insights, such as productivity, turn-around time, man hours spent, internal and external feedback received, may be evaluated for the employee. Based on the insights, the professional profile for the employee may be generated.

In an implementation, the system may share the generated professional profile of the employee automatically with a designated supervisor. In an example, the system 102 may communicate the professional profile to a device 108 belonging to the designated supervisor. The system 102 may identify the designated supervisor for the employee based on the organizational ontology created for the employee. In an example, the professional profile of the employee may be shared with the device 108 over the network 106.

Figure 2A:
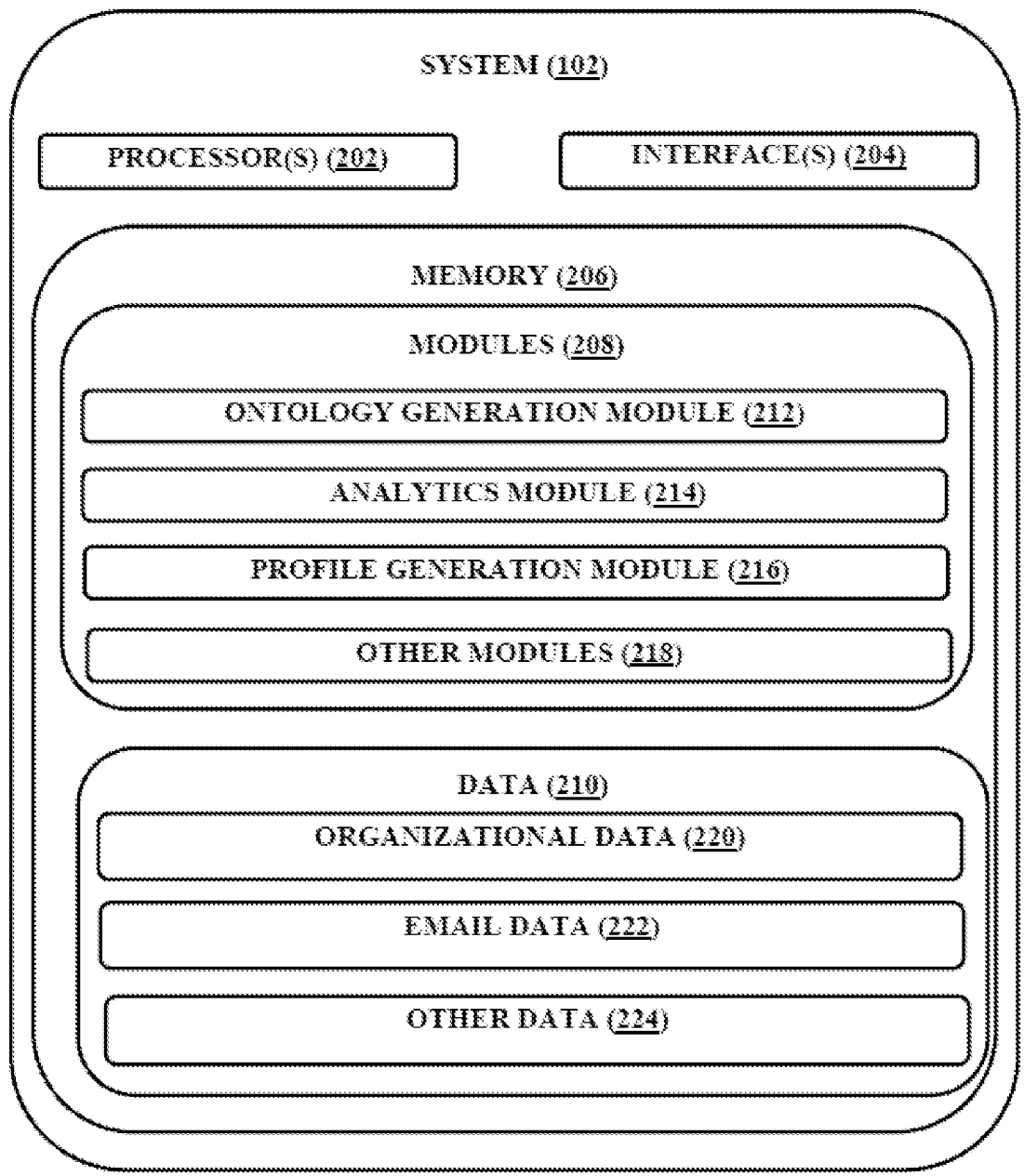
FIG. 2A illustrates detailed workings of the system, in according with an embodiment of the present subject matter.

FIG. 2A illustrates the system 102 in detail, in accordance with an embodiment of the present disclosure. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions or modules stored in the memory 206.

The I/O interface 204 may include a variety of software and hardware interfaces, for example, a web interface, a graphical user interface, and the like. The I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or nonvolatile memory, such as read only memory (ROM), erasable programmable ROM, flash memories, hard disks, optical disks, a compact disks (CDs), digital versatile disc or digital video disc (DVDs) and magnetic tapes. The memory 206 may include modules 208 and data 210.

The modules 208 include routines, programs, objects, components, data structures, etc., which perform particular tasks or implement particular abstract data types. In one implementation, the modules 208 may include an ontology generation (OG) module 212, an analytics module 214, a profile generation (PG) module 216 and other modules 218. The other modules 218 may include programs or coded instructions that supplement applications and functions of the system 102.

The data 210, amongst other things, serves as a repository for storing data processed, received, and generated by one or more of the modules 208. The data 210 may also include organization data 220, email data 222, and other data 224. Each of the aforementioned modules is explained in detail in subsequent paragraphs of the specification.

Figure 2B:
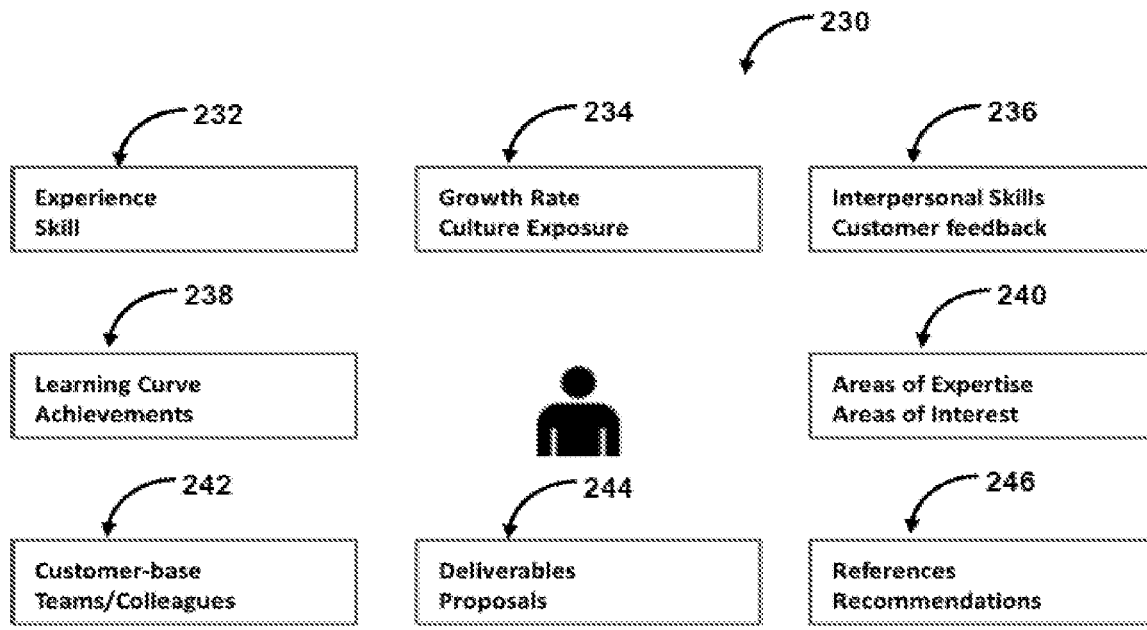
FIG. 2B illustrates exemplary organizational ontology, in according with an embodiment of the present subject matter.

In operation, the system 102 may generate a professional profile for an employee based on analysis of email data of the employee. As described earlier, the system 102 may build an organizational ontology for the employee. In an implementation, the OG module 212 may generate the organizational ontology for the employee based on one or more data sources such as employee designation, workflow structures, skill and experience, areas of expertise, customer base, teams, colleagues, reporting structures, and the like for the employee. A typical organizational ontology 230 is as depicted in FIG. 2B. As depicted the organizational ontology may have one or more branches 232-246. These branches may include, without limitation, Experience/Skill 232, Growth Rate/Culture Exposure 234, Interpersonal Skills/Customer Feedback 236, Learning Curve/Achievements 238, Areas of Expertise and Interest 240, Customer-base/Teams and Colleagues 242, Deliverables/proposals 244, and References/Recommendations 246. These branches may be indicative of interrelationships between the employee with other employees as well as with tasks, skills, customers, and expertise. In an exemplary implementation, the OG module 212 may generate the organizational ontology as an XML structure with resource description framework (RDF). In an example, data required to generate the organizational ontology may be stored as organization data 220.

Figure 2C:
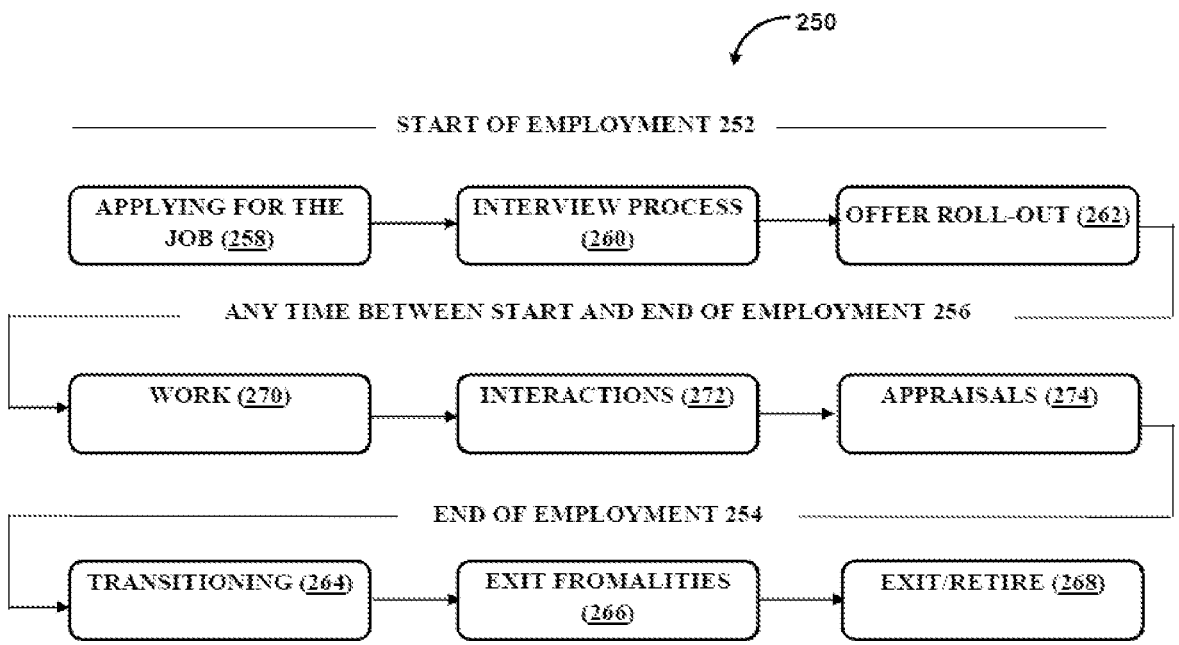
FIG. 2C illustrates exemplary employee lifecycle, in according with an embodiment of the present subject matter.

Once the organizational ontology is generated, the analytics module 214 may pull email data for the employee from the database 104. In an implementation, the analysis 214 may pull the email data for multiple stages of an employee lifecycle of the employee. An exemplary employee lifecycle 250 is as depicted in FIG. 2C. As shown, the employee lifecycle may be divided into three stages—start of employment 252, end of employment 254, and any time between start and end of employment 256. In an example, the start of employment 252 may have branches such as Applying for the Job 258, Interview process 260 and Offer Roll-out 262. These branches may be indicative of processes performed by the employee or for the employee in the organization, at the start of employment. Similarly, the end of employment 254 may have branches such as Transitioning 264, Exit Formalities 266, and Exit/Retire 268. These branches may be indicative of processes performed by the employee or with the employee during the end of the employee's tenure at the organization. The most vital information about the employee may be indicated through the branches under the phase "any time between the start and end of employment 256. This phase may include branches such as Work 270, Interactions 272, and Appraisals 274. These branches may be indicative of projects undertaken, projects completed, KRAs, KPIs, client interactions, leads generated, team meetings, appraisals, appreciations, complaints, escalations, and the like for the employee.

As described, the analytics module 214 may be configured to pull email data for the employee for each of the branches depicted in the employee lifecycle 250. The analytics module 214, in one embodiment, may analyze the email data to identify professional and personal emails sent/received by the employee. In an example, the analytics module 214 may analyze the email data based on a natural language processing (NLP) analysis. The email headers, subject lines, recipients and signatures may be analyzed to identify the emails that are personal and the emails that are work related. The work related emails, in an implementation, may be stored in the email data 222 for further analysis.

In an embodiment, the analytics module 214 may analyze the professional emails for each branch of the organizational ontology to generate one or more insights for the employee. For example, if an email is a certification to the user for successfully completing a training schedule, then parsing of the email may be done to identify what kind of courses were undertaken, how much time was taken to complete the schedule, what kinds of skill sets were acquired and the like by the employee. Further these insights may be analyzed against the ontology to determine how these insights would affect the employee's performance and set goals. In another example, a feedback email received by the employee may be analyzed in context to determine whether the email is a complaint, a general feedback or appreciation. Further, based on the organizational ontology, it may be identified that the employee has received the feedback email for a project wherein he/she had three junior resources working under him/her. This may in turn be useful to evaluate the employee's management qualities, based on the feedback email received. In yet another example, the employee may have received a recommendation email. Such an email may be analyzed by the analytics module 214 and it may be identified that the email was received from a superior outside of the employee's designated department. Based on such analysis, it may be then evaluated that the employee may be utilized for cross-departmental activities. This insight, in turn would aid in deciding a growth path for the employee.

In an implementation, the PG module 216 may generate the professional profile for the employee based on the one or more insights generated by the analytics module 214. In one example, the PG module 216 may generate the professional profile in a predetermined format/template stored in the system 102. In another implementation, the PG module 216 may periodically update the professional profile for the employee based on data received from the analytics module 214. In one example, the PG module 216 may be configured to communicate the professional profile of the employee to a designated personnel on their computer device. For example, the professional profile may be communicated to a Human Resource (HR) Head of the organization. In another example, the PG module 216 may share the professional profile with a Talent Acquisition team such that new hiring, for replacing the employee, may be done in line with the professional profile of the employee. Also, the professional profile may be utilized to formulate and execute new projects and/or tasks.

Figure 3:
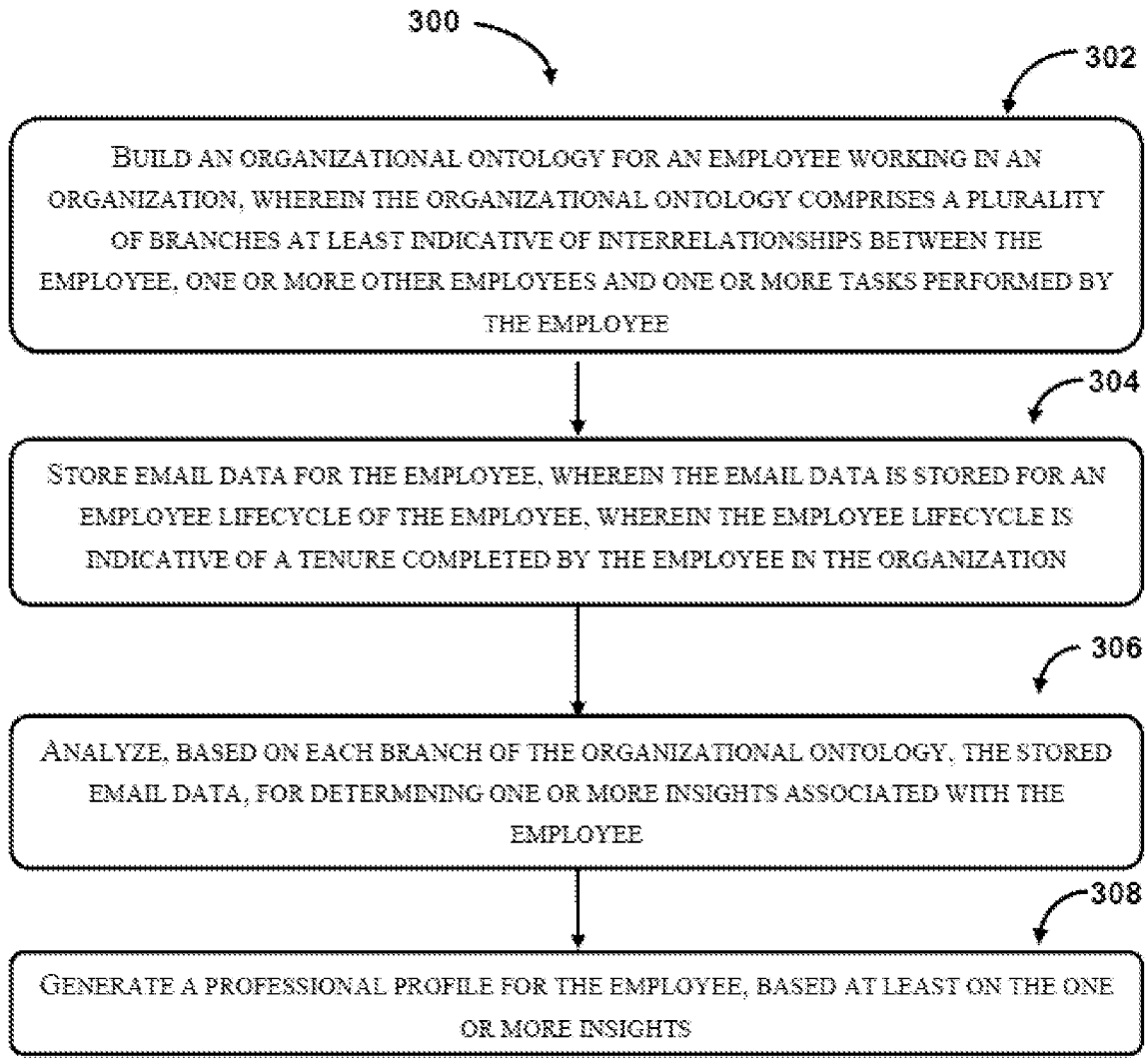
FIG. 3 illustrates a method for generating a professional profile, in accordance with an embodiment of the present subject matter.

Referring now to FIG. 3, a method 300 for generating a professional profile for an employee is illustrated. The method may start at step 302, wherein an organizational ontology for the employee may be built. In an implementation, the organizational ontology may at least include interrelationships between the employee, one or more other employees, and one or more tasks performed by the employee.

At step 304, email data associated with the employee may be stored. In one implementation, the email data may be stored for an employee lifecycle of the employee. In an example, the employee lifecycle may be indicative of a tenure completed by the employee in the organization.

At step 306, the email data may be analyzed for each branch of the organizational ontology to determine one or more insights associated with the employee. In an exemplary implementation, the email data may be analyzed using one or more of data analysis techniques such as natural language processing analysis, syntactic parsing, entity recognition analysis, co-reference analysis, sentiment analysis, or quantitative text analysis.

At step 308, the professional profile for the employee may be generated based at least on the one or more insights.

Although implementations for methods and systems for enabling a maintenance activity of an equipment have been described in language specific to structural features and/or methods, it is to be understood that the appended claims are not necessarily limited to the specific features or methods described. Rather, the specific features and methods are disclosed as examples of implementations for generating real time network alerts based on analytics.

We claim:

1. A system for generating an employee profile, the system comprising:
   a memory; and
   a processor coupled to the memory, wherein the processor is configured to execute instructions stored in the memory to:
   build an organizational ontology for an employee working in an organization using a Resource Description Framework (RDF), wherein the organizational ontology comprises a plurality of branches at least indicative of interrelationships between the employee, one or more other employees, one or more tasks performed by the employee during an employee lifecycle of the employee;
   store email data for the employee, wherein the email data is stored for the employee lifecycle of the employee, wherein the employee lifecycle is indicative of a tenure completed by the employee in the organization, and wherein the employee lifecycle comprises a start of employment, an end of employment and any time in between the start of employment and the end of the employment;
   analyze, based on each branch of the organizational ontology, the stored email data for determining one or more insights associated with the employee, wherein the analyze comprise analyzing signature present in the email data, and parsing the email data to identify kind of courses undertaken, time taken to complete schedule of the courses, and kinds of skill sets acquired by the employee, while the email is related to a certification to the employee for successfully completing a training schedule; and
   generate a professional profile for the employee, based at least on the one or more insights.

2. The system of claim 1, wherein the processor is further configured to execute instructions stored in the memory to analyze the email data based on one of a natural language processing analysis, syntactic parsing, entity recognition analysis, co-reference analysis, sentiment analysis, and quantitative text analysis.

3. The system of claim 1, wherein the plurality of branches of the organizational ontology are further indicative of designations, reporting structures, entity relationships, one or more skill sets, department information, and job profiles associated with a plurality of employees in the organization.

4. The system of claim 1, wherein the processor is further configured to execute instructions stored in the memory to update the professional profile for the employee based on new email data received for the plurality of branches of the organizational ontology during each stage of the employee lifecycle of the employee.

5. A method for generating an employee profile, the method comprising:
   building an organizational ontology for an employee working in an organization using a Resource Description Framework (RDF), wherein the organizational ontology comprises a plurality of branches indicative of interrelationships between the employee, one or more other employees and one or more tasks performed by the employee during an employee lifecycle of the employee;
   storing email data for the employee, wherein the email data is stored for the employee lifecycle of the employee, wherein the employee lifecycle is indicative of a tenure completed by the employee in the organization, and wherein the employee lifecycle comprises a start of employment, an end of employment and any time in between the start of the employment and the end of the employment;
   analyzing, based on each branch of the organizational ontology, the stored email data, for determining one or more insights associated with the employee, wherein the analyzing comprise analyzing signature present in the email data, and parsing the email data to identify kind of courses undertaken, time taken to complete schedule of the courses, and kinds of skill sets acquired by the employee, while the email is related to a certification to the employee for successfully completing a training schedule; and
   generating a professional profile for the employee, based at least on the one or more insights.

6. The method of claim 5, further comprising analyzing the email data based on one of a natural language processing analysis, syntactic parsing, entity recognition analysis, co-reference analysis, sentiment analysis, and quantitative text analysis.

7. The method of claim 5, wherein the plurality of branches of the organizational ontology are further indicative of designations, reporting structures, entity relationships, one or more skill sets, department information, and job profiles associated with a plurality of employees in the organization.

8. The method of claim 5, further comprising updating the professional profile for the employee based on new email data received for the plurality of branches of the organizational ontology during each stage of the employee lifecycle of the employee.

* * * * *